United States Patent
Aizaki (10) Patent No.: US 8,415,069 B2
(45) Date of Patent: Apr. 9, 2013

(54) BONDING STRUCTURE OF SEPARATOR AND FUEL CELL

(75) Inventor: Jiro Aizaki, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 0 days.

(21) Appl. No.: 12/085,639

(22) PCT Filed: Nov. 29, 2006

(86) PCT No.: PCT/IB2006/003402
§ 371 (c)(1), (2), (4) Date: May 28, 2008

(87) PCT Pub. No.: WO2007/063392
PCT Pub. Date: Jun. 7, 2007

(65) Prior Publication Data
US 2008/0299442 A1 Dec. 4, 2008

(30) Foreign Application Priority Data
Dec. 2, 2005 (JP) .................................. 2005-349341

(51) Int. Cl.
*H01M 8/02* (2006.01)
(52) U.S. Cl.
USPC .......................................... 429/469; 429/468
(58) Field of Classification Search .................. 429/468, 429/469
See application file for complete search history.

(56) References Cited

U.S. PATENT DOCUMENTS

| 2001/0055708 A1 | 12/2001 | Krasij et al. |
| 2003/0013001 A1 | 1/2003 | Koch et al. |
| 2003/0150162 A1 | 8/2003 | Inagaki et al. |
| 2008/0026281 A1* | 1/2008 | Hayashi et al. ................ 429/36 |

FOREIGN PATENT DOCUMENTS

| CA | 2 563 540 A1 | 11/2005 |
| DE | 102 03 174 A1 | 9/2002 |
| DE | 103 03 655 A1 | 8/2003 |
| JP | 2002-141083 A | 5/2002 |
| JP | 2003-077499 A | 3/2003 |
| JP | 2004-047270 A | 2/2004 |
| JP | 2004-165125 A | 6/2004 |
| JP | 2006-019204 A | 1/2006 |

OTHER PUBLICATIONS

Office Action issued Mar. 15, 2012 in DE 11 2006 003 176.7 and English translation thereof.

\* cited by examiner

*Primary Examiner* — Ula C Ruddock
*Assistant Examiner* — Frank Chernow
(74) *Attorney, Agent, or Firm* — Kenyon & Kenyon LLP (57) ABSTRACT

A fuel cell includes a plurality of unit cells, each having a membrane electrode assembly and a separator stacked with an intervening first sealing member and the unit cells being stacked on one another with an intervening second sealing member. The first sealing member is spread on and along a surface of the separator where at least a part of the first sealing member overlaps with the second sealing member in a direction in which the unit cells are stacked, and the thickness of the first sealing member is smaller in a region where it overlaps with the second sealing member than in a region where it does not overlap with the second sealing member.

7 Claims, 5 Drawing Sheets

BONDING STRUCTURE OF SEPARATOR AND FUEL CELL

This is a 371 national phase application of PCT/IB2006/003402 filed 29 Nov. 2006, claiming priority to Japanese Patent Application No. 2005-349341 filed 02 Dec. 2005, the contents of which are incorporated herein by reference.

BACKGROUND OF THE INVENTION

1. Field of the Invention

The present invention relates to a fuel cell and a bonding structure of a separator for the fuel cell. More specifically, the invention is directed to an improved bonding structure of a separator that is provided in a unit cell of a fuel cell.

2. Description of the Related Art

A fuel cell is typically fabricated by stacking a plurality of unit cells. In such a fuel cell, e.g., in a solid polymer type fuel cell, each of the unit cells includes a membrane electrode assembly ("MEA"), having an electrolyte membrane and a pair of electrodes respectively arranged on both surfaces thereof, and a pair of separators for sandwiching the membrane electrode assembly between the separators. A number of such unit cells are stacked on one another to provide a fuel cell of stacked structure. A metal separator is used as the separator. Certain types of fuel cells include a resin frame that is inserted between the metal separator and the membrane electrode assembly. In this type of fuel cell, the metal separator is bonded to the resin frame by an adhesive agent. Furthermore, it is typical that sealing is provided by interposing a gasket between unit cells (see Japanese Patent Application Publication No. JP-A-2003-77499, for instance)

In the fuel cell referred to above, it is often the case that an internal pressure generated in an operating process of the fuel cell applies a force to the adhesive agent. For this reason, it is desirable that the adhesive agent is provided below the gasket so that it still can effectively perform the sealing function even under such circumstances. This ensures that the force attributable to the internal pressure is counterbalanced by the reaction force of the gasket, thereby inhibiting any peel-off of the adhesive agent.

However, the prior art fuel cell suffers from a problem in that, in the process of operating the fuel cell for instance, the adhesive layer is subject to elastic or plastic deformation due to the reaction force of the gasket, thereby causing deformation to the metal separator.

In other words, when the fuel cell is operated at a temperature within a range of, e.g., from sub-zero to 90° C., misalignment between the metal separator and the resin frame often occurs due to the difference in their linear expansion coefficients (thermal expansion coefficients). Thus, a thick adhesive layer should be formed to avoid an occurrence of such misalignment. In the meantime, a high level of sealing performance required of the gasket interposed between the individual unit cells makes the gasket exert a reaction force (e.g., elasticity-attributable repulsive force) in itself. The adhesive layer is deformed by the reaction force of the gasket, which in turn often causes deformation to the metal separator (e.g., stainless steel separator) that has a reduced thickness and a low bending strength. Another problem is that this may degrade or deteriorate sealability in between the gasket and the separator.

SUMMARY OF THE INVENTION

In view of the foregoing and other problems, the present invention provides a fuel cell and a bonding structure of a separator for the fuel cell that assure sealability of a gasket, while suppressing deformation of a separator at the same time.

A fuel cell in accordance with a first aspect of the present invention, comprises: first, second and third members that are stacked, the third member being located between the first member and the second member; a first sealing member that seals between the first member and the third member; and a second sealing member that seals between the second member with the third member. The first sealing member has a region where it overlaps with the second sealing member and a region where does not overlap with the second sealing member in a direction in which the first, second and third member are stacked. A thickness of the first sealing member is smaller in a region where it overlaps with the second sealing member relative to a thickness of the first sealing member in a region where it does not overlap with the second sealing member.

A fuel cell in accordance with a second aspect of the present invention comprises: a plurality of unit cells, each having a membrane electrode assembly and a separator stacked with an intervening first sealing member and the unit cells being stacked on one another with an intervening second sealing member, wherein the first sealing member is spread on and along a surface of the separator under a condition that at least a part of the first sealing member overlaps with the second sealing member in the direction in which the unit cells are stacked, and wherein the thickness of the first sealing member is smaller where it overlaps with the second sealing member than where it does not overlap with the second sealing member.

In accordance with the first and second aspects of the present invention, the first sealing member (e.g., adhesive layer) is designed to be thinner at least where the adhesive layer overlaps with the second sealing member (e.g., gasket). This restrains the reaction force (e.g., elasticity-attributable repulsive force) of the second sealing member without destroying its sealability. Restraining the reaction force in the region where the adhesive layer overlaps with the second sealing member reduces the bending force exerted on the separator. In the conventional structure, increased thickness of an adhesive layer is one cause of deforming a separator. In contrast, the first and second aspects of the present invention restrains the deformation of the first sealing member (e.g., adhesive layer) by reducing its thickness in the region where the first sealing member overlaps with the second sealing member. This restrains the force that is applied to the separator, and thus reduces deformation of the separator. The region of the first sealing member that does not overlap with the second sealing member may have an increased thickness, which means that the first sealing member does not lose its ability to suppress the misalignment of the separator which may otherwise occur due to the difference in thermal expansion.

It is preferred that the first sealing member of the fuel cell is an adhesive layer and the second sealing member thereof is a gasket.

It is preferred that an adhesive agent with an increased coefficient of elongation is used as the first sealing member. The use of an adhesive agent with an increased coefficient of elongation makes it possible not only to suppress the misalignment of the separator, which may otherwise occur due to the difference in thermal expansion, but also to reduce the thickness of the adhesive layer in the region corresponding to the gasket, while suppressing any peel-off of the adhesive layer at its surface boundary.

A third aspects of the present invention provides a bonding structure of a separator for use in fabricating a fuel cell, the fuel cell comprising a plurality of unit cells, each having an electrode assembly and a separator stacked with an intervening first sealing member and the unit cells being stacked on one another with an intervening second sealing member, wherein the first sealing member is spread on and along a surface of the separator under a condition that at least a part of the first sealing member overlaps with the second sealing member in a direction in which the unit cells are stacked, and wherein the first sealing member has a smaller thickness in a region where it overlaps with the second sealing member than that in a region where it does not overlap with the second sealing member.

In accordance with the third aspect of the present invention, the thickness of the first sealing member is reduced at least in the regions where it overlaps with the second sealing member. This makes it possible to restrain the reaction force (e.g., elasticity-attributable repulsive force) of the second sealing member without destroying its sealability. Restraining the reaction force in the region where the first sealing member overlaps with the second sealing member results in a weakened action to bend the separator. In the conventional structure, the use of a thick adhesive layer is one cause of deforming a separator. In contrast, the present invention restrains the deformation of the first sealing member (e.g., adhesive layer) by reducing the thickness of the first sealing member in the region where the first sealing member overlaps with the second sealing member. This restrains the force applied to the separator, thereby reducing deformation of the separator. The region of the first sealing member where it does not overlap with the second sealing member may have an increased thickness, which means that the first sealing member does not lose its ability to suppress the misalignment of the separator which may otherwise occur due to the difference in thermal expansion.

The present invention provides the following advantageous effects. By reducing the thickness of the first sealing member (e.g., adhesive layer) in the region corresponding to the second sealing member, it is possible to restrain the misalignment of the separator, which may otherwise occur due to the difference in thermal expansion, and also to suppress the deformation of the separator. Moreover, if an adhesive agent with a high coefficient of elongation is used, a thin adhesive layer may be used, thereby minimizing the misalignment of the separator, which may otherwise occur due to the difference in thermal expansion, and the deformation of the separator, which may otherwise be caused by the reaction force of the second sealing member. Consequently, it becomes possible to assure sealability of the second sealing member while restraining the deformation of the separator.

BRIEF DESCRIPTION OF THE DRAWINGS

The above and other objects and features of the present invention will become apparent from the following description of preferred embodiments, given in conjunction with the accompanying drawings, in which.

DETAILED DESCRIPTION OF THE PREFERRED EMBODIMENTS

The present invention will now be described in detail in accordance with an exemplary embodiment illustrated in the drawings.

FIGS. 1 through 5 show an embodiment of the present invention. A fuel cell and a bonding structure of a separator for the fuel cell in accordance with the present invention include a plurality of unit cells $C_{n-1}$, $C_n$, $C_{n+1}$ and so forth, each having a structure in which separators 3 are bonded to a frame 2 with an intervening first sealing member hereinbelow referred to as "adhesive layer") 12 comprised of, e.g., an adhesive layer, and a plurality of second sealing members (hereinbelow referred to as "gasket") 4 comprised of, e.g., a gasket, and adapted to provide sealing between the separators 3 of the neighboring unit cells. In this embodiment, the adhesive layer 12 is spread on and along the surface of each of the separators 3 under the condition that at least a part of the adhesive layer 12 overlaps with the gasket 4 in the direction in which the unit cells $C_{n-1}$, $C_n$, $C_{n+1}$ and so forth are stacked. Furthermore, the adhesive layer 12 is formed such that the thickness of the adhesive layer 12 is reduced in the region where it overlaps with the gasket 4 relative to the thickness in the region where it does not overlap with the gasket 4.

In the following, description will be made regarding an instance where the fuel cell system 10 including a fuel cell 20 and the bonding structure of the separator for the fuel cell 20 is applied to a motor-vehicle-mounted electric power generation system for a fuel cell vehicle. It should be appreciated, however, that the present invention is not restricted to such an application but may be applied to any kind of vehicle, including, for example, ships, airplanes, streetcars and walking robots. In the embodiment described below, the fuel cell system 10 includes the fuel cell 20, an air supply line (oxidation gas supply line) 71 through which an oxidation gas is supplied to the fuel cell 20, an exhaust line 72 through which an offgas of the oxidation gas is exhausted from the fuel cell 20, a hydrogen source (fuel source) 40, a fuel supply line 74 through which a fuel gas is supplied from the hydrogen source 40 to the fuel cell 20, and a hydrogen recirculation line (fuel gas recirculation line) 75 through which an offgas of the fuel gas exhausted from the fuel cell 20 is recirculated to the fuel supply line 74.

Figure 1:
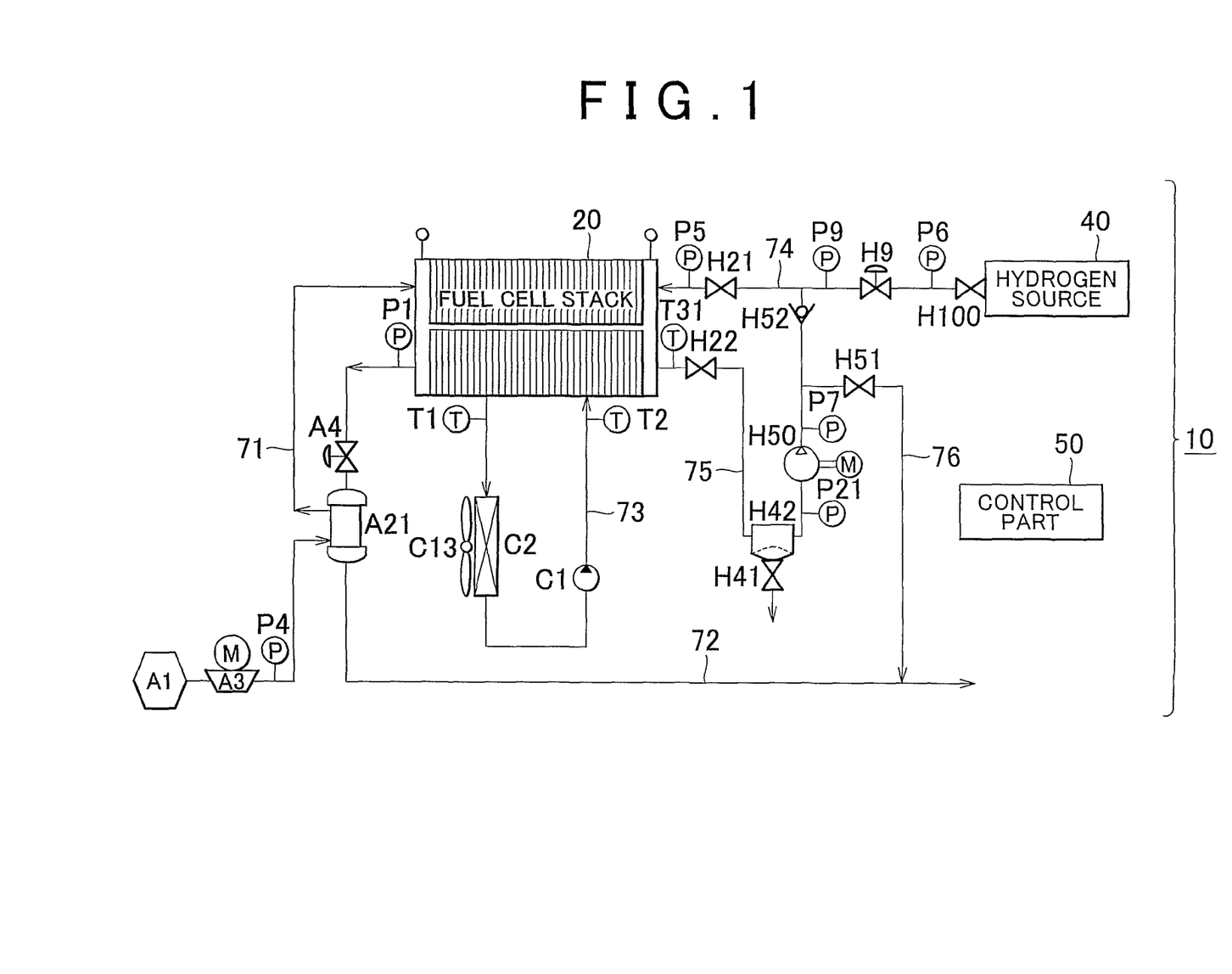
FIG. 1 is a system diagram schematically showing a fuel cell system in accordance with an embodiment of the present invention.
Figure 2:
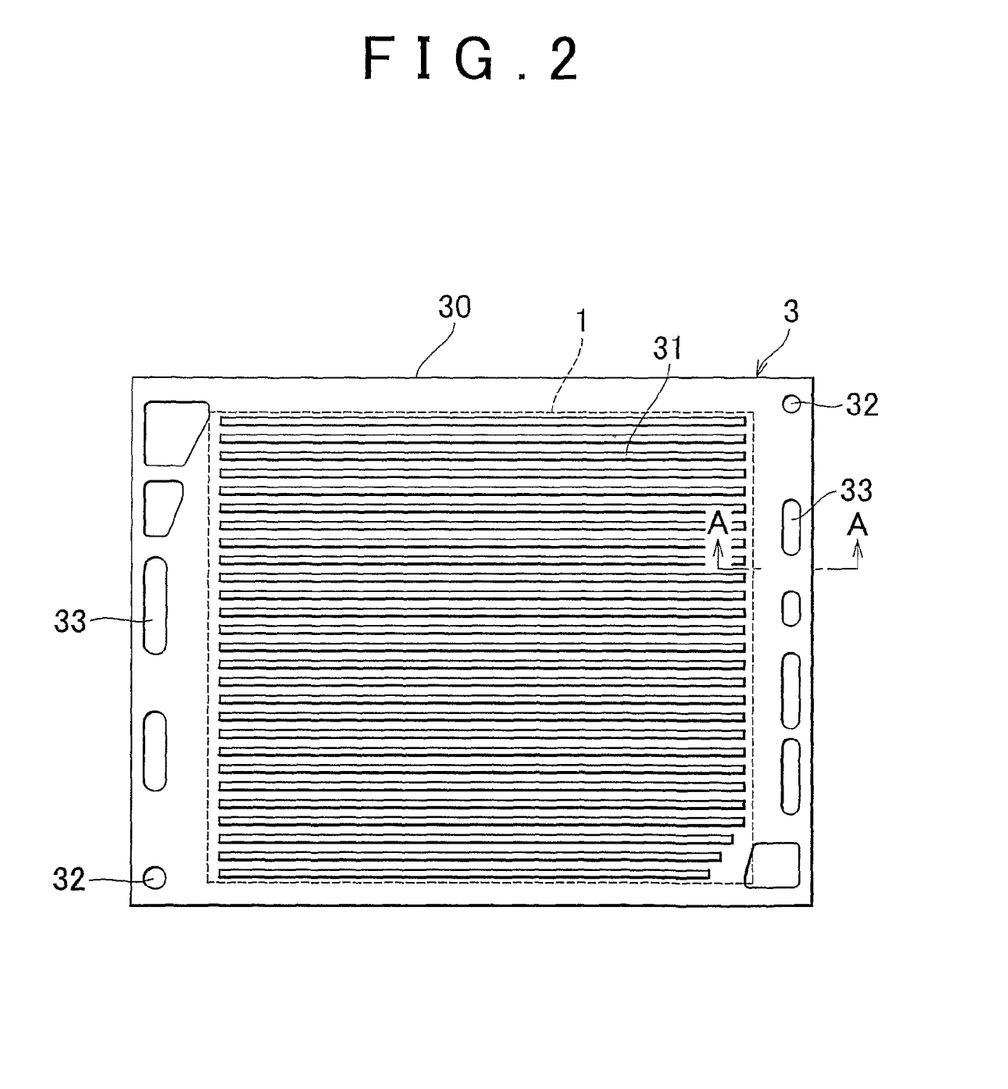
FIG. 2 is an overall plan view illustrating a separator employed in the fuel cell system in accordance with the embodiment of the present invention.
Figure 3:
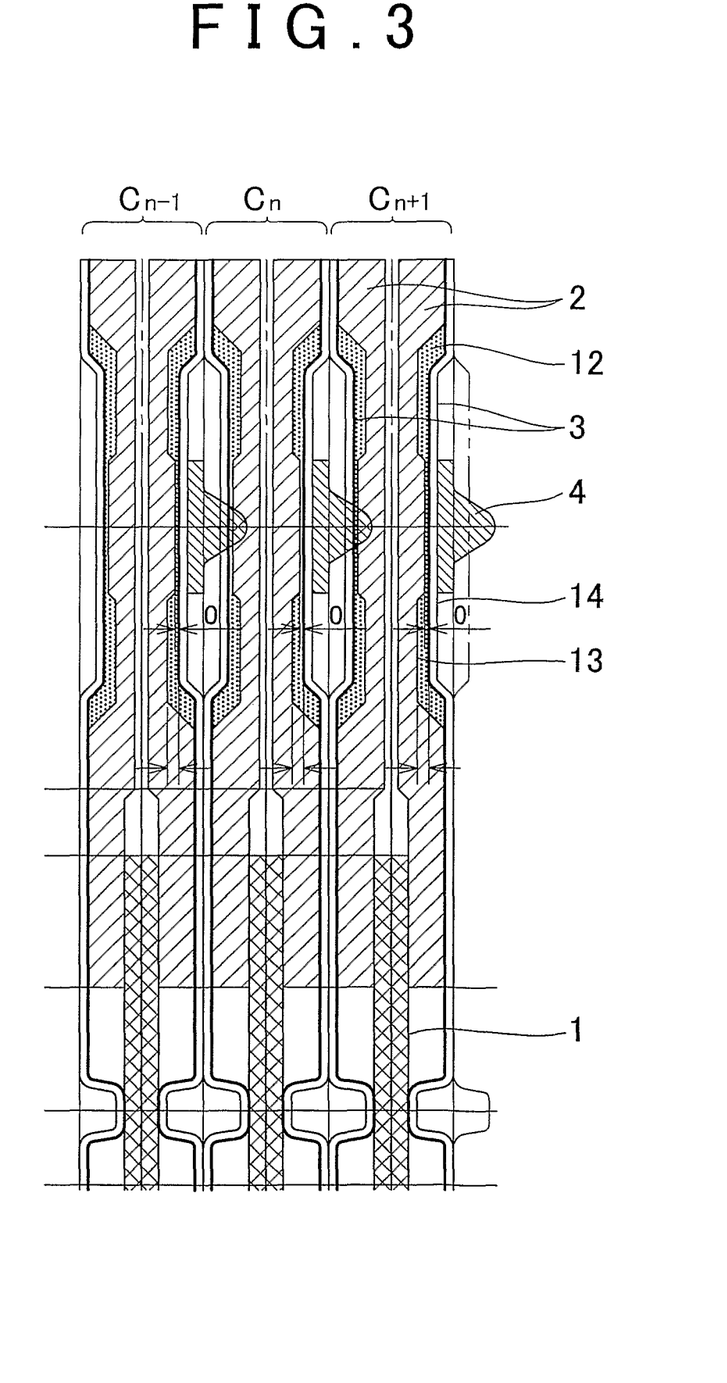
FIG. 3 is a cross-sectional view taken along line A-A in FIG. 2, showing a stack of unit cells.

FIG. 1 shows the overall configuration of the fuel cell system 10 and FIG. 2 is a plan view illustrating the separator for the fuel cell 20 employed in the fuel cell system 10. FIG. 3 is an enlarged cross-sectional view taken along line A-A in FIG. 2, showing a gasket of the fuel cell stack and its surroundings. The fuel cell 20 employed in this embodiment is of a cell structure having frames.

As shown in FIG. 1, air serving as the oxidation gas is supplied to an inlet port of the fuel cell 20 through the air supply line (oxidation gas supply line) 71. Provided on the air supply line 71 are an air filter A1 for removing particles from the air, a compressor A3 for pressurizing the air, a pressure sensor P4 for detecting the pressure of the air supplied, and a humidifier A21 for adding a required amount of moisture to the air. The compressor A3 is driven by an electric motor (auxiliary machine) that is controlled by a control unit 50, which will be described later. Although not shown in the drawings, an air flow meter (flow instrument) for detecting the quantity of the air flow is provided in the air filter A1.

Air offgas exhausted from the fuel cell 20 is discharged to the outside by way of the exhaust line 72. Provided on the exhaust line 72 are a pressure sensor P1 for detecting the gas pressure, a pressure-adjusting valve A4 and a heat exchanger of the humidifier A21. The pressure-adjusting valve A4 serves regulates the pressure (pressure reducer) of the air supplied to the fuel cell 20.

Detection signals of the pressure sensors P4 and P1 are transmitted to the control unit 50. The control unit 50 is sets the pressure and the quantity of the air supplied to the fuel cell 20 by controlling the electric motor of the compressor A3 and the aperture area of the pressure-adjusting valve A4.

Hydrogen gas that is used as the fuel gas is supplied from the hydrogen source (fuel source) 40 to a hydrogen inlet port of the fuel cell 20 via the fuel supply line 74. The hydrogen source 40 may be, for example, a high-pressure hydrogen tank, a fuel reformer or a hydrogen storage alloy.

Provided on the fuel supply line 74 are a shutoff valve H100 for passing or blocking the hydrogen from the hydrogen source 40, a pressure sensor P6 for detecting the pressure of the hydrogen gas supplied from the hydrogen source 40, a hydrogen pressure-adjusting valve H9 for reducing and adjusting the pressure of the hydrogen gas supplied to the fuel cell 20, a pressure sensor P9 for detecting the pressure of the hydrogen gas downstream of the hydrogen pressure-adjusting valve H9, a shutoff valve H21 for opening and closing the passage between the hydrogen inlet port of the fuel cell 20 and the fuel supply line 74, and a pressure sensor P5 for detecting the pressure of the hydrogen gas at the entrance of the fuel cell 20.

The hydrogen pressure-adjusting valve H9 may include a pressure regulator valve that performs a pressure reducing operation in a mechanical manner, but may be replaced with a valve whose opening degree is adjusted linearly or continuously by means of a pulse motor. Detection signals of the pressure sensors P5, P6 and P9 are transmitted to the control unit 50.

Hydrogen gas that is not consumed in the fuel cell 20 is exhausted to the hydrogen recirculation line (fuel gas recirculation line) 75 as hydrogen offgas and then returned to the fuel supply line 74 downstream of the hydrogen pressure-adjusting valve H9. Provided on the hydrogen recirculation line 75 are a temperature sensor T31 for detecting the temperature of the hydrogen offgas, pressure sensors P7 and P21 for detecting a gas pressure, a shutoff valve H22 for connecting and disconnecting the fuel cell 20 and the hydrogen recirculation line 75, a gas-liquid separator H42 for separating water from the hydrogen offgas, a water drainage valve H41 for allowing the water thus separated to be recovered into a tank (not shown) outside the hydrogen recirculation line 75, a hydrogen pump H50 for pressurizing the hydrogen offgas, and a check valve H52.

The shutoff valves H21 and H22 close off the anode side of the fuel cell 20. Detection signals of the temperature sensor T31 are transmitted to the control unit 50. The control unit 50 controls the operation of the hydrogen pump H50.

The hydrogen offgas is mixed with the hydrogen gas in the fuel supply line 74 and then supplied to the fuel cell 20 for reuse. The check valve H52 inhibits the hydrogen gas in the fuel supply line 74 from flowing back to the hydrogen recirculation line 75. The shutoff valves H100, H21 and H22 are operated by the signals supplied from the control unit 50.

The hydrogen recirculation line 75 is connected to the exhaust line 72 by a purge flow path 76 through an exhaust control valve H51. The exhaust control valve H51 is an electromagnetic shutoff valve and is controlled by the control unit 50 to thereby discharge or purge the hydrogen offgas to the outside. Such purging operation may be carried out intermittently to prevent the concentration of excessive impurities in the hydrogen gas at the fuel electrode side, due to the repeated recirculation of the hydrogen offgas, which may lead to reduction in a cell voltage.

The fuel cell 20 has a coolant inlet port and a coolant outlet port connected to each other by a coolant line 73 through which coolant is circulated. Provided on the coolant line 73 are a temperature sensor T1 for detecting the temperature of the coolant drained from the fuel cell 20, a radiator (heat exchanger) C2 for dissipating the heat of the coolant to the outside, a pump C1 for pressurizing and circulating the coolant, and a temperature sensor T2 for detecting the temperature of the coolant supplied to the fuel cell 20. The radiator C2 is provided with a cooling fan C13 rotatingly driven by an electric motor.

The control unit 50 controls the operation of the valves and the motors of the fuel cell system 10, by receiving accelerator signals indicative of the required load and acquiring control information from a variety of sensors in the fuel cell system 10 (pressure sensors, temperature sensors, flow meters, output ammeters, output voltmeters and the like).

The control unit 50 is comprised of a computer control system not shown in the drawings. The computer control system has known components, including a CPU, a ROM, a RAM, a HDD, an input/output interface, a display and the like. Commercially available computer control systems may be used as the computer control system of the present invention.

The fuel cell 20 is comprised of a fuel cell stack formed by stacking a required number of the unit cells that generate electricity by using the fuel gas and the oxidation gas supplied thereto. The electricity generated by the fuel cell 20 is fed to a power control unit not shown in the drawings. The power control unit includes an inverter for actuating a drive motor of a motor vehicle, an inverter for operating a variety of auxiliary machines such as a compressor motor, a hydrogen pump motor and the like, and a DC-DC converter for recharging a battery, such as a secondary cell or the like, and supplying electricity from the battery means to motors.

Now, the construction of the fuel cell 20 will be described in detail. As illustrated in FIG. 3, the fuel cell stack is fabricated by stacking a plurality of unit cells $C_{n-1}$, $C_n$, $C_{n+1}$ and so forth (hereinbelow merely indicated by "$C_n$" as a representative of the whole unit cells) in a number sufficient to generate a desired level of electric voltage. Each of the unit cells $C_n$ includes an electricity-generating body 1, a pair of resin frames 2 that sandwich the electricity-generating body 1 and separators 3. A gasket 4 is provided between the unit cells $C_n$ neighboring with each other.

The pair of resin frames 2 is bonded together by an adhesive layer not shown in the drawings. The frames 2 are of a same configuration and form a structure corresponding to one unit cell in shape. The frames 2 are formed from an insulating material, such as a hardening resin or the like. The adhesive layer includes an adhesive agent suitable for bonding the frames 2 together. The electricity-generating body 1 is inserted into the adhesive layer and bonded to the frames. Each of the frames 2 has a sealing-purpose recessed portion 13 formed in the vicinity of one peripheral edge of the frames 2 and provided at its surface which contacts with the separator. The recessed portion 13 ensures that, when the gasket 4 is interposed between two neighboring unit cells, a stress of suitable magnitude is generated to provide sealing between the unit cells.

The separators 3 are bonded to the outer surfaces of the frames 2, with an adhesive layer 12 lying between them. The separators 3 are of the same configuration, and each of the separators 3 has a concave portion 14 corresponding to the recessed portion 13 of the respective frames 2. The adhesive layer 12 is preferably formed of an adhesive agent with a high coefficient of elongation.

The separators 3 of two neighboring unit cells have concave portions 14 that face each other, thus leaving a space into which the gasket 4 is inserted and fixed in place.

As illustrated in FIG. 2, each of the separators 3 is provided with a plurality of flow channels 31 that keep the unit cells $C_n$ spaced apart and provide passages for supplying the hydrogen gas (fuel gas) or the air (oxidation gas) to a hydrogen electrode side. The individual flow channels 31 are connected to a manifold 33 that serves as a common passage through which the hydrogen gas and the air are supplied to the flow channels 31. Coolant flow channels (not shown) are provided on the other side surface of the separator 3 from the surface shown in FIG. 2. This makes it possible to cool the separators 3 by allowing the coolant to absorb the heat generated in the process of electrochemical reaction occurring in the unit cells $C_n$. Some of the manifolds 33 is also provided with a flow path for the coolant. At the corner of each separator 3, there are provided coupling holes 32 into which fastener members such as bolts or the like may be inserted to combine a plurality of unit cells into a single fuel cell stack.

The separator 3 must be electrically conductive and therefore may be metallic. More specifically, examples of the separator 3 include a carbon separator made of carbon and resin and a metal separator formed of a stainless steel plate with or without an electrically conductive material and an anti-corrosion material applied on the surface thereof. The following description will be focused on the metal separator by way of example. Furthermore, the separator 3 must be precision-machined with ease in view of the fact that it has fine-sized complex structural portions inclusive of the flow channels 31. In addition, the separator 3 needs to be formed as thin as possible so that the unit cells fabricated from the separator 3 can be stacked in sufficient numbers to meet the requirement for high voltage generation of electricity. For the reasons noted above, the separator 3 is fabricated from a metal plate 30 made of an easy-to-machine metallic material, e.g., aluminum, iron, titanium and stainless steel, which contains carbon. The metal plate 30 has a thickness of, e.g., 0.05-0.3 mm, and preferably no greater than 0.1 mm, in order to allow the unit cells to be stacked in sufficient numbers. In consideration of machinability, the metal plate 30 must have a certain degree of elasticity and must be equal to or greater than $7 \times 10^{10}$ Pa in Young's modulus. Moreover, the metal plate 30 must have a physical property capable of standing against the environmental temperature ranging, e.g., from −30° C. to +120° C., and a chemical property capable of standing against the acidic atmosphere of pH2 or more. As long as the metal plate 30 has a structure that can sandwich the electricity-generating body 1 and comply with the conditions set forth above, there is no problem in forming the flow channels 31 of fine size in the region that overlaps the electricity-generating body 1, while maintaining a prescribed mechanical strength.

The electricity-generating body 1 responsible for power generation in the fuel cell 20 may have a variety of structures depending on the kind of the fuel cell 20. In case of a solid oxide fuel cell for example, the electricity-generating body 1 has a basic structure in which an electrolyte such as zirconia or the like is interposed between an air electrode, e.g., lanthanum magnetite, and a fuel electrode, e.g., nickel. In case of a fused carbonate fuel cell, the electricity-generating body 1 has a structure in which an electrolyte panel including a support member is interposed between a fuel electrode and an air electrode. The support member is made of $LiAlO_2$ or the like and is impregnated with a carbonate. In case of a phosphoric acid fuel cell, the electricity-generating body 1 has a structure in which a phosphoric acid electrolyte is interposed between a fuel electrode and an air electrode. In case of a polymer acid fuel cell, the electricity-generating body 1 has a structure in which an electrolyte membrane containing a polymer electrolyte, such as a fluorine-based ion exchange membrane or the like, is interposed between a fuel electrode and an air electrode. In the present embodiment, the electricity-generating body 1 is particularly suitable for a power source in an electrically powered car and is provided with a polymer electrolyte membrane electrode assembly in which catalyst electrodes, each containing a catalyst supported on a porous support layer, are formed on both sides of a polymer electrolyte membrane.

Figure 4:
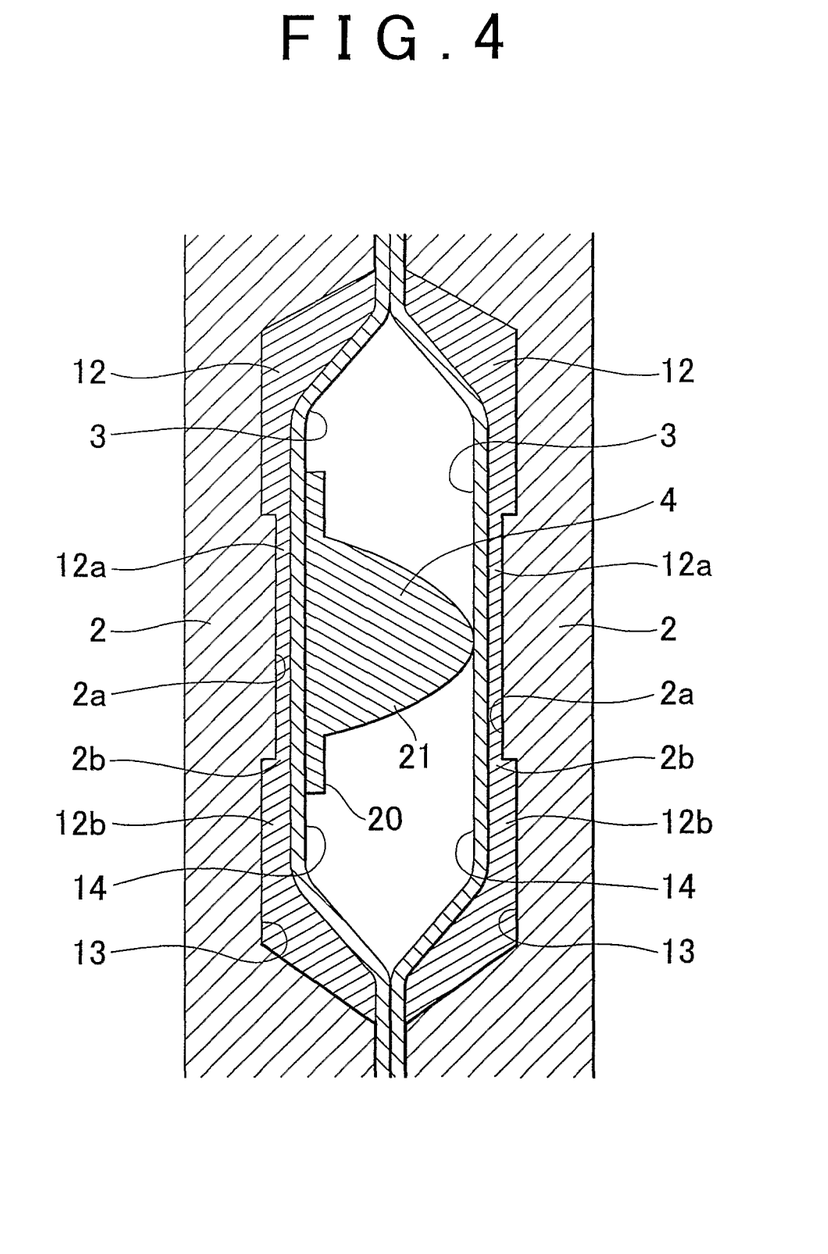
FIG. 4 is a partially enlarged view showing a configuration of a gasket and its surroundings in the stack of unit cells illustrated in FIG. 3.

Next, the configuration of the gasket 4 and its surroundings will be described in detail. FIG. 4 shows a cross-section of the gasket 4 and its surrounding regions in the present embodiment, showing an enlarged view of the adjoining portions of two neighboring unit cells $C_n$.

The gasket 4 is provided with a plate-like base portion 20 and a contact portion 21 projecting from the plate-like base portion 20. The contact portion 21 makes contact with the opposing separator 3, thereby preventing the fluid filled in an electricity-generating area from leaking to the outside. The gasket 4 may be made of an elastic material with chemical resistance, e.g., typical resin or polymer such as elastomer or the like.

Provided on the recessed portion 13 of each of the frames 2 is a raised portion 2a that protrudes toward the gasket 4. The raised portion 2a has a surface of planar shape and, preferably, has a width at least equal to or greater than that of the contact portion 21 of the gasket 4. In the present embodiment, the width of the raised portion 2a is configured to be somewhat greater than the width of the contact portion 21. The raised portion 2a ensures that the adhesive layer 12 is thinner at least in the region where the adhesive layer 12 overlaps with the contact portion 21 of the gasket 4 that projects from the plate-like base portion 20.

The concave portion 14 of each of the separators 3 has a generally planar bottom surface, and the gasket 4 is placed between two opposing concave portions 14 of the neighboring separators 3. The raised portions 2a of the frames 2 that are formed on the recessed portions 13 of each of the frames 2 also face each other.

In this way, the adhesive layer 12 and the gasket 4 are overlapped with each other in the stacking direction. Furthermore, the thickness of the adhesive layer 12 in the region 12a, where the layer overlaps with the contact portion 21 of the gasket 4, is reduced relative to the thickness of the adhesive layer in the region 12b, where the layer does not overlap with the gasket 4. To be more specific, the region 12a may have, for example, a thickness of about 0.05 mm and a width of about 2 mm, while the region 12b may be, for example, 0.15 mm thick.

The bonding structure configured as above works in the following manner.

Figure 5:
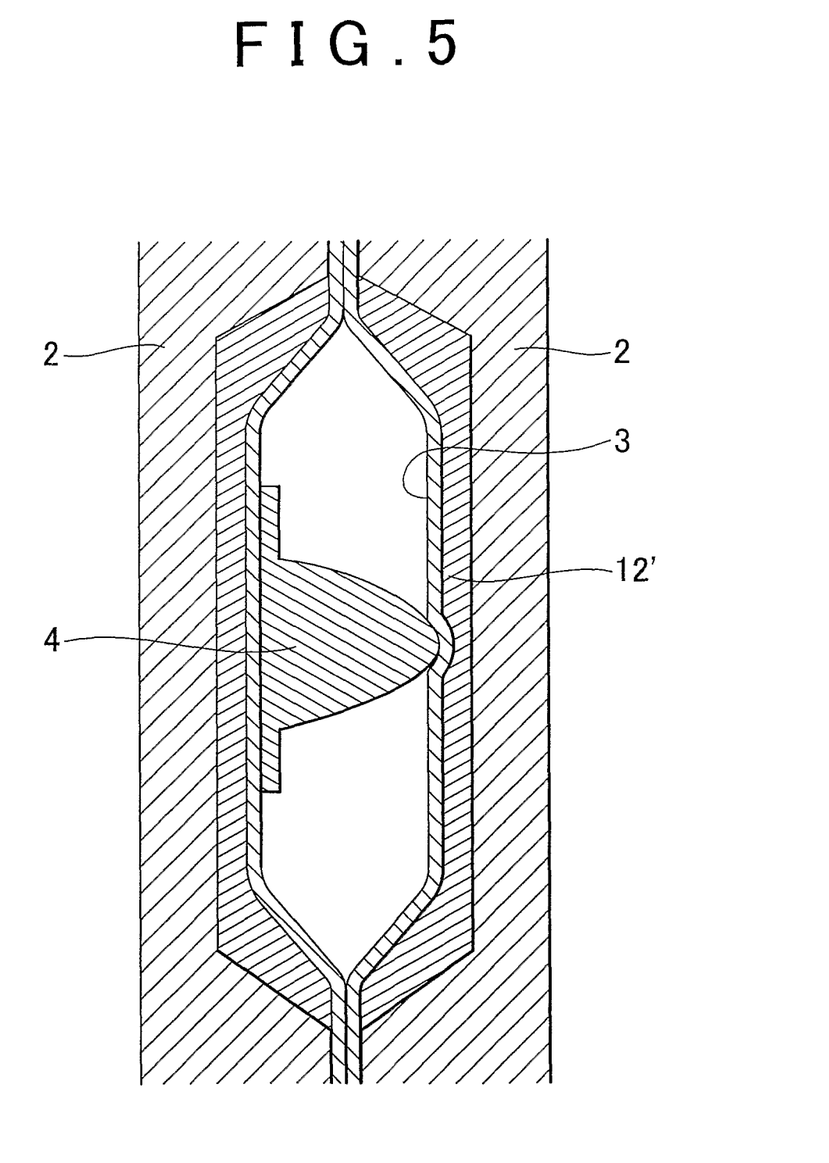
FIG. 5 is a cross-sectional view depicting a separator in a deformed condition.

Referring to FIG. 5, in a hypothetical case where the adhesive layer 12' has a uniform thickness even in the region where the layer overlaps with the gasket 4, the adhesive layer 12' is elastically or plastically deformed by the reaction force of the gasket 4, which leads to the deformation of one of the adjoining separators 3. This may weaken the seal between the adjoining separators 3. In contrast, in the present invention, the adhesive layer 12 has a smaller thickness in the region 12*a* than that in the region 12*b* where it does not overlap with the gasket 4. This makes it possible to control the reaction force (e.g., elasticity-attributable repulsive force) of the gasket 4 without destroying its sealability. In this process, deformation of the adhesive layer 12 is suppressed. Even if deformation occurs in the adhesive layer 12, the maximum amount of the deformation is confined to within the thickness of the region 12*a* where the layer overlaps with the contact portion 21 of the gasket 4. In other words, the deformation of the adhesive layer 12 is controlled within a range where the reaction force of the gasket 4 is permissible.

This helps to suppress the deformation of the separator 3 and thus enhance the sealability of the gasket 4. The region 12*b* of the adhesive layer 12 where the layer does not overlap with the gasket 4 has a thickness great enough to absorb the difference in thermal expansion of the frame 2 and the separator 3. This inhibits the occurrence of a misalignment between the frame 2 and the separator 3. Furthermore, the adhesive layer 12 is formed using an adhesive agent that has a high coefficient of elongation, which makes it possible to sufficiently reduce the thickness of the adhesive layer 12 in the region corresponding to the gasket 4.

As described above, in the fuel cell 20 of the present invention, the thickness of the adhesive layer 12 in the region corresponding to the gasket 4 is smaller than the thickness in other regions. This assists in avoiding the misalignment between the frame 2 and the separator 3, which may otherwise occur due to the difference in thermal expansion. This also suppresses the deformation of the separator 3, thereby improving the sealability of the gasket 4. Moreover, the use of an adhesive agent with a high coefficient of elongation allows the adhesive layer 12 to be formed thin, which makes it possible to minimize the misalignment between the frame 2 and the separator 3, which may otherwise occur due to the difference in thermal expansion, and the deformation of the separator 3, which may otherwise be caused by the reaction force of the gasket 4.

While the invention has been shown and described in the context of one preferred embodiment, this is for the illustrative purpose only and is not intended to limit the scope of the invention. It will be understood by those skilled in the art that various changes and modifications may be made. For example, the present invention may be applied to a gasket that seals a pair of separators belonging to a single unit cell, although the foregoing description has been made in relation to an embodiment wherein the present invention is applied to the gasket 4 which seals the separators 3 of two adjoining unit cells.

Furthermore, unlike in the foregoing embodiment wherein the raised portions 2*a* are formed on both of the mutually opposing recessed portions 13 of the frames 2, it would also be possible to provide the raised portion 2*a* on only the recessed portion 13 of the frame 2 that faces the contact portion 21 of the gasket 4. In other words, the adhesive layer 12 against which the contact portion 21 of the gasket 4 is pressed may be designed to have the thin region 12*a*, while making uniform the thickness of the adhesive layer 12 adjacent to the plate-like base portion 20 of the gasket 4, near region 2*b*, for example.

It is preferable that the resin frame 2 has higher stiffness than the first sealing member 12. Here, high stiffness means that, for example, deformation amount by an external force is relatively small.

In addition, although the foregoing describes an embodiment wherein the adhesive layer serves as the first sealing member 12 and the gasket acts as the second sealing member 4, this is for the illustrative purpose only. The gasket may act as the first sealing member and the adhesive layer may serve as the second sealing member. The first sealing member 12 provides sealing in a single unit cell $C_n$, while the second sealing member 4 provides inter-cell sealing in the fuel cell stack. The first sealing member 12 and the second sealing member 4 may be made of either a same kind of material or different materials. Further, the first sealing member may provides inter-cell sealing in the fuel cell stack while the second sealing member provides sealing in a single unit cell.

In addition, although the foregoing describes an embodiment wherein the resin frame 2 is neighboring to the first sealing member 12, this is not intended to limit the scope of the invention. A member which neighbors to the first sealing member is not limited into a frame figure, and may be a separator, for example. In addition, a member which neighbors to the first sealing member is not limited into resin-made, and may be made of metal or carbon materials.

The invention claimed is:

1. A fuel cell, comprising:
   first and third members that are stacked, the third member being located between the first member and a second member located on an adjacent fuel cell;
   an adhesive layer that seals between the first member and the third member; and
   a gasket that seals between the second member and the third member,
   wherein the adhesive layer has a region where it overlaps with the gasket and a region where does not overlap with the gasket in a direction in which the first, second and third member are stacked,
   wherein a thickness of the adhesive layer is smaller in a region where it overlaps with the gasket relative to a thickness of the adhesive layer in a region where it does not overlap with the gasket,
   wherein the second member and the third member are contacted with each other at both their respective ends, and at least one of the second member and the third member having concave portions which form an enclosed space in which the gasket is inserted, the concave portions enclosing both sides of the gasket,
   wherein the first member has higher stiffness than the adhesive layer, and
   wherein the first member has a recessed portion and a raised portion in a region where the adhesive layer is provided, the raised portion corresponds to the smaller thickness region of the adhesive layer and the recessed portion corresponds to the larger thickness region of the adhesive layer.

2. A fuel cell, comprising:
   a plurality of unit cells, each having a membrane electrode assembly and a separator stacked with an intervening adhesive layer and the unit cells being stacked on one another with an intervening gasket,
   wherein the adhesive layer is spread on and along a surface of the separator where at least a part of the adhesive layer overlaps with the gasket in a direction in which the unit cells are stacked,
   wherein a thickness of the adhesive layer is smaller in a region where it overlaps with the gasket relative to a thickness of the adhesive layer in a region where it does not overlap with the gasket,
   wherein the separators of two neighboring unit cells are contacted with each other at both their respective ends, wherein at least one of the separators has concave portions which form an enclosed space in which the gasket is inserted, the concave portions enclosing both sides of the gasket, wherein a frame that sandwiches the membrane electrode assembly is provided between the membrane electrode assembly and the separator, wherein the adhesive layer bonds the separator to the frame, wherein the frame has a sealing-purpose recessed portion formed in the vicinity of one peripheral edge of the frame and provided at its surface which contacts with the separator, wherein the concave portions correspond to the recessed portion of the frame, wherein the gasket is fixed in the space formed by the concave portions of the separator, and wherein a raised portion that protrudes toward the gasket is provided on the recessed portion of the frame.

3. The fuel cell according to claim 2, wherein the frame is formed from an insulating material.

4. The fuel cell according to claim 2, wherein the raised portion has a width equal to or greater than that of a contact portion of the gasket to the separator.

5. A structure of a separator for use in fabricating a fuel cell, the fuel cell comprising a plurality of unit cells, each having a membrane electrode assembly and a separator stacked with an intervening adhesive layer and the unit cells being stacked on one another with an intervening gasket, wherein the adhesive layer is spread on and along a surface of the separator where at least a part of the adhesive layer overlaps with the gasket in a direction in which the unit cells are stacked, wherein a thickness of the adhesive layer is reduced in a region where it overlaps with the gasket relative to a thickness of the adhesive layer in a region where it does not overlap with the gasket, wherein the separators of two neighboring unit cells are contacted with each other at both their respective ends, wherein at least one of the separators has concave portions which form an enclosed space in which the gasket is inserted, the concave portions enclosing both sides of the gasket, wherein a frame that sandwiches the membrane electrode assembly is provided between the membrane electrode assembly and the separator, wherein the adhesive layer bonds the separator to the frame, wherein the frame has a sealing-purpose recessed portion formed in the vicinity of one peripheral edge of the frame and provided at its surface which contacts with the separator, wherein the concave portions correspond to the recessed portion of the frame, wherein the gasket is fixed in the space formed by the concave portions of the separators, and wherein a raised portion that protrudes toward the gasket is provided on the recessed portion of the frame.

6. The fuel cell according to claim 2, wherein a portion of the adhesive layer is located at an area where the separators of two neighboring unit cells are contacted with each other.

7. The fuel cell according to claim 2, wherein a portion of the adhesive layer is located at the concave portion and does not overlap with the gasket.

* * * * *

UNITED STATES PATENT AND TRADEMARK OFFICE
CERTIFICATE OF CORRECTION

| | |
|---|---|
| PATENT NO. | : 8,415,069 B2 |
| APPLICATION NO. | : 12/085639 |
| DATED | : April 9, 2013 |
| INVENTOR(S) | : Aizaki |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 587 days.

Signed and Sealed this
Thirteenth Day of August, 2013

Teresa Stanek Rea
*Acting Director of the United States Patent and Trademark Office*

UNITED STATES PATENT AND TRADEMARK OFFICE
CERTIFICATE OF CORRECTION

PATENT NO. : 8,415,069 B2  
APPLICATION NO. : 12/085639  
DATED : April 9, 2013  
INVENTOR(S) : Jiro Aizaki Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1016 days.

Signed and Sealed this

First Day of September, 2015

Michelle K. Lee
*Director of the United States Patent and Trademark Office*